US012655539B2

(12) United States Patent
Jogikalmath et al.

(10) Patent No.: US 12,655,539 B2
(45) Date of Patent: Jun. 16, 2026

(54) STAPLE FIBERS CONTAINING RELEASABLE SURFACE MODIFYING MOLECULES

(71) Applicant: QED Labs, Inc., Billerica, MA (US)

(72) Inventors: Gangadhar Jogikalmath, Chestnut Hill, MA (US); Deepak Arabagatte Ramappa, Somerville, MA (US)

(73) Assignee: QED Labs, Inc., Billerica, MA (US)

( * ) Notice: Subject to any disclaimer, the term of this patent is extended or adjusted under 35 U.S.C. 154(b) by 0 days.

(21) Appl. No.: 18/149,531

(22) Filed: Jan. 3, 2023

(65) Prior Publication Data

US 2023/0142258 A1 May 11, 2023

Related U.S. Application Data

(63) Continuation of application No. 16/461,226, filed as application No. PCT/US2017/062570 on Nov. 20, 2017, now abandoned.

(60) Provisional application No. 62/429,486, filed on Dec. 2, 2016, provisional application No. 62/424,856, filed on Nov. 21, 2016.

(51) Int. Cl.

| | |
|---|---|
| ***D01D 5/26*** | (2006.01) |
| ***C08L 23/26*** | (2025.01) |
| ***D01F 1/10*** | (2006.01) |
| ***D01H 1/42*** | (2006.01) |
| ***D04H 1/42*** | (2012.01) |
| ***D04H 1/56*** | (2006.01) |

(52) U.S. Cl.

CPC ................ *D01D 5/26* (2013.01); *C08L 23/26* (2013.01); *D01F 1/10* (2013.01); *D01F 1/103* (2013.01); *D01F 1/106* (2013.01); *D01H 1/42* (2013.01); *D04H 1/42* (2013.01); *D04H 1/56* (2013.01)

(58) Field of Classification Search

None

See application file for complete search history.

(56) References Cited

U.S. PATENT DOCUMENTS

| | | | | |
|---|---|---|---|---|
| 3,655,420 A | 4/1972 | Tichenor | | |
| 6,465,094 B1 * | 10/2002 | Dugan | D01D 5/36 | 428/373 |
| 6,811,716 B1 | 11/2004 | Stengaard et al. | | |

(Continued)

FOREIGN PATENT DOCUMENTS

| | | |
|---|---|---|
| CN | 103421205 A | 12/2013 |
| JP | H09132868 A | 5/1997 |

(Continued)

OTHER PUBLICATIONS

JPO, Office Action for JP Application No. 2019-526492, Aug. 9, 2022.

(Continued)

*Primary Examiner* — Shawn Mckinnon

(74) *Attorney, Agent, or Firm* — Hodgson Russ LLP

(57) ABSTRACT

Staple fibers and compositions formed from staple fibers are disclosed herein. The fibers are functionalized with molecules that render fabrics comprising the disclosed fibers hydrophobic, hydrophilic, and/or release molecules upon exposure to an external stimulus. Also presented are methods of synthesizing the same and a fabric comprising woven yarns including the staple fiber.

15 Claims, 2 Drawing Sheets

(56) References Cited

U.S. PATENT DOCUMENTS

| | | | | |
|---|---|---|---|---|
| 2003/0166785 | A1* | 9/2003 | Medsker ................ | C08G 65/18 525/242 |
| 2010/0136076 | A1 | 6/2010 | Frandsen | |
| 2012/0269877 | A1 | 10/2012 | Yamakoshi | |
| 2015/0240059 | A1 | 8/2015 | Yang | |
| 2015/0240759 | A1 | 8/2015 | Lopes | |
| 2016/0348279 | A1 | 12/2016 | Ramappa et al. | |
| 2017/0267815 | A1 | 9/2017 | Ramappa et al. | |
| 2017/0298202 | A1 | 10/2017 | Ramappa et al. | |
| 2019/0048188 | A1 | 2/2019 | Jogikalmath et al. | |

FOREIGN PATENT DOCUMENTS

| | | | |
|---|---|---|---|
| JP | 2009523921 | A | 6/2009 |
| TW | I270673 | A1 | 1/2007 |
| WO | 2008032844 | | 6/2008 |
| WO | 2016057072 | A1 | 4/2016 |
| WO | 2016061112 | A1 | 4/2016 |
| WO | WO2016057072 | * | 4/2016 |

OTHER PUBLICATIONS

ILOP, Office Action for IL Application No. 266456, Nov. 22, 2021.

* cited by examiner

STAPLE FIBERS CONTAINING RELEASABLE SURFACE MODIFYING MOLECULES

CROSS REFERENCE TO RELATED APPLICATIONS

This application is a continuation of U.S. patent application Ser. No. 16/461,226, filed May 15, 2019, which is a U.S. National Stage Application of International Application No., PCT/US2017/062570, filed Nov. 20, 2017, which claims priority to U.S. Provisional Application No. 62/424,856, filed on Nov. 21, 2016, and to U.S. Provisional Application No. 62/429,486, filed on Dec. 2, 2016, the disclosures of which are hereby incorporated by reference.

FIELD OF THE DISCLOSURE

This disclosure relates to fibers. More specifically, this disclosure relates to stimuli responsive release from a fiber.

BACKGROUND OF THE DISCLOSURE

Rendering textiles hydrophobic can enable their use in environments where the textile may be exposed to water or high humidity conditions. It may be desirable to protect the user from such moisture to enable a comfortable feel for a user.

Traditionally, fluorinated molecules, organosilicon molecules, polyolefins, and waxes were used to impart hydrophobicity to fabrics. There are techniques in which a fabric may be rendered hydrophobic. This can include using inherently hydrophobic materials as polytetrafluoroethylene (Teflon) or applying a coating of a hydrophobic molecules to a fabric to render it hydrophobic. The inherently hydrophobic materials are not strong and do not mechanically function like traditional synthetic (e.g., nylon, polyester) or natural (e.g., cotton, silk) fibers. In addition, the inherently hydrophobic materials do not aid in dyeing of the fabric or are not amenable to other finishes that may be applied to the surface of the fabric, such as flame retardants, antimicrobials, UV-protective agents, insecticides, insect-repellents, or printed patterns (e.g., camouflages, crease-resistant finishes, etc.). Topical coatings may be removed during, for example, use, wearing, or washing, which eliminates any benefit to a user. Topical treatments also tend to block the natural pores in fabrics thereby rendering the fabric less breathable. Rendering surfaces hydrophobic or otherwise modifying the surface of a material can present challenges during manufacturing. What is needed are new methods and materials to modify the surface of a material that may overcome these deficiencies.

This is of particular importance where many useful fabrics are made of blends of staple fibers such as blends of cotton/nylon or cotton/polyester. In essence, what is needed is a way to inherently modify the hydrophobicity or other properties of the blended yarn where such a modification is initiated in situ, such as after the fabric is made, finishes are applied, and the fabric is ready to be converted into an article of clothing.

Therefore, what is needed are improved compositions, articles, and methods that provide surface modification of polymeric materials.

BRIEF SUMMARY OF THE DISCLOSURE

A method of delivering a surface modifying molecule that has a functional group or chemical moiety that can bond, react, or interact favorably with the polymer matrix and also has a surface modifying group is described. This may, for example, render a fabric hydrophilic or hydrophobic. In one embodiment, a surface modifying molecule is anchored to a polymer matrix using an anchor molecule. The anchor molecule and surface modifying molecule may be added to a melt phase of the polymer matrix and converted into staple fibers. Such staple fibers containing these surface modifying molecules can then be added to a blend of other fibers and such that the release of surface modifying molecules within the interstices of a yarn can be triggered as desired during the process of spinning, weaving, and/or finishing (converting) the desired fabric.

The surface modifying molecules may be carried at high concentrations with articles of polymer such as synthetic and natural fibers, staples, particles, etc.

The surface modifying molecule may not react with the molecule of the carrier with which it is combined.

The carriers may then release these surface modifying molecules into the surroundings on application of a trigger such as a change in humidity, a change in pressure, application of a current, exposure to radiation, and/or other mechanisms. When such molecules are released, the molecules may either bind to the surrounding materials, such as other staple molecules, in a blend or are slowly released to the surrounding in a controlled manner.

In a first embodiment, a staple fiber is provided. The staple fiber includes a polymer matrix, a surface modifying molecule connected to the polymer matrix, and an anchor molecule attached to the surface modifying molecule by covalent bonding, an electrostatic interaction, a hydrophobic interaction, an aromatic interaction, hydrogen bonding, and/or a van der Waals interaction. The surface modifying molecule includes a functional group that interacts with the polymer matrix and a surface modifying group. The anchor molecule has reactive functional groups and is a polymeric or oligomeric molecule.

The functional group can be configured to bond or react with the polymer matrix.

The anchor molecule can have a chemically similar characteristic as the polymer matrix.

The reactive functional groups can include at least one of amines, amides, imides, hydroxyls, anhydrides, isocyanates, carboxyls, epoxy, sulfhydryls, thiols, acid chlorides (acyl chloride), aldehydes, esters, ketones, alkyl halides, or arenes.

The polymeric or oligomeric molecule can include a water insoluble polymer. The water insoluble polymer can include polyethylene.

The polymeric or oligomeric molecule can include one of a polyolefin, polyester, polyamide, styrenic, vinyl polymer, or copolymers thereof.

The surface modifying group can include fluorine.

The surface modifying group can include a derivative of a water soluble polymer including functional groups that are reactive with groups present on the functional group that interacts with the polymer matrix.

The water soluble polymer can include polyethyleneoxide.

The functional groups can react and form a covalent interaction that includes one of epoxy-amine, epoxy-anhydride, anhydride-hydroxyl, anhydride-amine, amine-isocyanate, hydroxyl-isocyanate, acid chloride-amine, epoxy-phenol, epoxy-carboxyls, arene-anhydride, aldehyde-amine, ketone-amine, ester-amine, alkyl halide-amine, or isocyanate-anhydride.

The surface modifying molecule can include an amine group, an anhydride group, an acid chloride group, a carboxyl group, or a reactive group configured to react with a nylon end group or the hydroxyl functionalities of cellulose.

The surface modifying molecule can include hydrophobic and hydrophilic blocks. The hydrophobic blocks can include polytetrafluoroethylene (PTFE) and the hydrophilic blocks can include ethylene oxide blocks.

The surface modifying molecule can include a fluorinated polyetherdiol and the anchor molecule can include a maleated polypropylene.

The surface modifying molecule can include a hydroxypropylmethacrylate copolymerized with a vinyl monomer containing fluorinated groups. The vinyl monomer containing fluorinated groups can include 2-(perfluorohexyl)ethyl acrylate.

The surface modifying molecule can include a fluorinated polyether molecule.

A fabric comprising woven yarns can include the staple fiber of any variation of the first embodiment.

The surface modifying molecule can render the fabric hydrophobic or hydrophilic. The surface modifying molecule also can render the fabric one or more of insecticidal, repellant to insects, fragrant, antibacterial, antiperspirant, UV absorbing, fungicidal, and/or medicinal.

The surface modifying molecule can be a phase change material.

In a second embodiment, a method is provided. The method comprises: adding surface modifying molecules to a melt phase of a polymer matrix; forming a carrier; and adding an anchor molecule to the melt phase of the polymer matrix. The carrier includes the surface modifying molecules. Each of the surface modifying molecules includes a functional group that interacts with the polymer matrix and a surface modifying group. The anchor molecule is configured to anchor the surface modifying molecule to the polymer matrix.

The forming can include injection molding, extrusion, casting, and/or fiber spinning.

The carrier may be a polyolefin. The surface modifying molecule may be an epoxidized siloxane molecule.

The polyolefin may be LLDPE, LDPE, HDPE, or polypropylene.

In a third embodiment, a method is provided. The method comprises adding the staple fiber of any variation of the first embodiment or the carrier formed by any variations of the second embodiment to a yarn or fabric. The surface modifying molecule is released within the interstices of the yarn or fabric.

The releasing can occur during one of spinning, weaving, and/or finishing the fabric. The releasing also can occur during a heat treatment. The releasing also can occur during one or more of a change in pH, a change in temperature, a change in humidity, a change in pressure, application of a current, and/or exposure to radiation.

The yarn can include a nylon-cotton blend.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Figure 1:
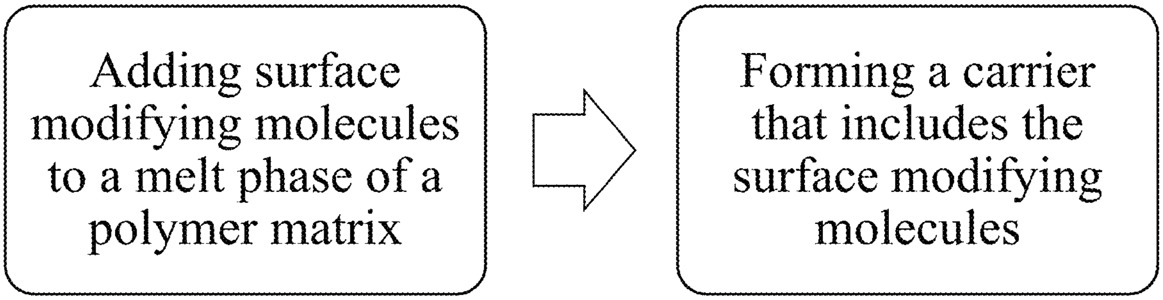
FIG. 1 shows a flowchart of a method in accordance with the present disclosure.
Figure 2:
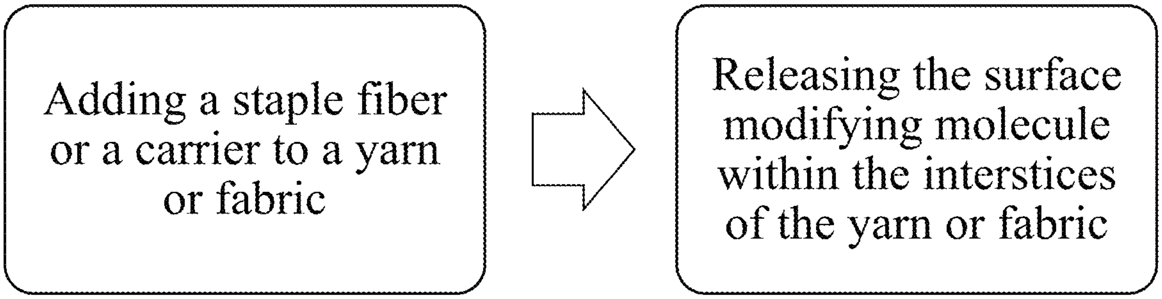
FIG. 2 shows another flowchart of a method in accordance with the present disclosure.
Figure 3:
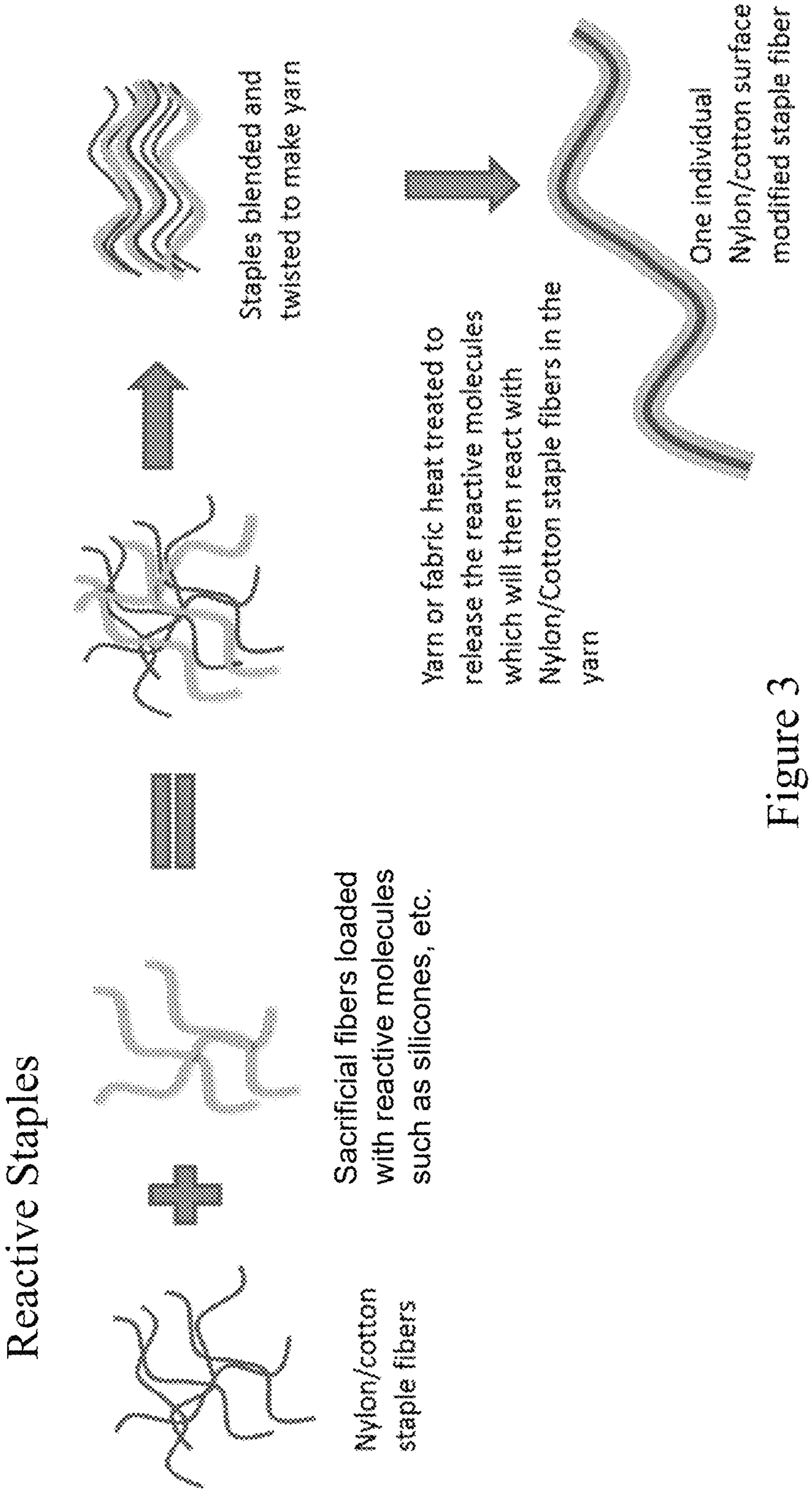
FIG. 3 illustrates fibers mixing together to create the embodiments disclosed herein.

Although claimed subject matter will be described in terms of certain embodiments, other embodiments, including embodiments that do not provide all of the benefits and features set forth herein, are also within the scope of this disclosure. Various structural, logical, and process step changes may be made without departing from the scope of the disclosure.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using the compositions. That is, where the disclosure describes and/or claims a feature or embodiment associated with a system or apparatus or a method of making or using a system or apparatus, it is appreciated that such a description and/or claim is intended to extend these features or embodiment to embodiments in each of these contexts (i.e., system, apparatus, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

In general, when a range is presented, all combinations of that range are disclosed. For example, 1 to 4 includes not only 1 to 4 but also 1 to 2, 1 to 3, 2 to 3, 2 to 4 and 3 to 4.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

As used herein, unless otherwise stated, the term "group" refers to a chemical entity that has one terminus that can be covalently bonded to other chemical species. Examples of groups include, but are not limited to:

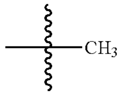

and

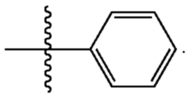

As used herein, unless otherwise stated, the term "moiety" refers to a chemical entity that has two or more termini that can be covalently bonded to other chemical species. Examples of moieties include, but are not limited to:

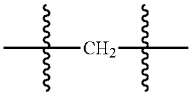 [SMILES: *C*]

and

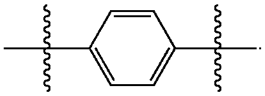

As used herein, unless otherwise indicated, the term "alkyl" refers to branched or unbranched saturated hydrocarbon groups. Examples of alkyl groups include, but are not limited to, methyl groups, ethyl groups, propyl groups, butyl groups, isopropyl groups, tert-butyl groups, and the like. For example, the alkyl group can be a $C_1$ to $C_{12}$ (including all integer numbers of carbons and ranges of numbers of carbons therebetween) alkyl group. The alkyl group can be unsubstituted or substituted with one or more substituent. Examples of substituents include, but are not limited to, various substituents such as, for example, halogens (—F, —Cl, —Br, and —I), aliphatic groups (e.g., alkyl groups, alkenyl groups, alkynyl groups), aryl groups, alkoxide groups, carboxylate groups, carboxylic acids, ether groups, and the like, and combinations thereof.

As used herein, unless otherwise indicated, the term "aliphatic" refers to branched or unbranched hydrocarbon groups that, optionally, contain one or more degrees of unsaturation. Degrees of unsaturation include, but are not limited to, alkenyl groups/moieties, alkynyl groups/moieties, and cyclic aliphatic groups/moieties. For example, the aliphatic group can be a $C_1$ to $C_{12}$, including all integer numbers of carbons and ranges of numbers of carbons therebetween, aliphatic group. The aliphatic group can be unsubstituted or substituted with one or more substituent. Examples of substituents include, but are not limited to, various substituents such as, for example, halogens (—F, —Cl, —Br, and —I), additional aliphatic groups (e.g., alkenes, alkynes), aryl groups, alkoxides, carboxylates, carboxylic acids, ether groups, and the like, and combinations thereof.

As used herein, unless otherwise indicated, the term "aryl" refers to $C_5$ to $C_{14}$, including all integer numbers of carbons and ranges of numbers of carbons therebetween, aromatic or partially aromatic carbocyclic groups. The aryl group can comprise polyaryl moieties such as, for example, fused rings or biaryl moieties. The aryl group can be unsubstituted or substituted with one or more substituent. Examples of substituents include, but are not limited to, various substituents such as, for example, halogens (—F, —Cl, —Br, and —I), aliphatic groups (e.g., alkenes, alkynes), aryl groups, alkoxides, carboxylates, carboxylic acids, ether groups, and the like, and combinations thereof. Examples of aryl groups include, but are not limited to, phenyl groups, biaryl groups (e.g., biphenyl groups), and fused ring groups (e.g., naphthyl groups).

The present disclosure relates to compositions, articles, and methods providing surface modification of polymeric materials.

As disclosed herein, a staple may be a fiber of a standardized length (e.g., 10 mm to 50 mm, but preferably 35 mm) and may be of any composition. A staple fiber can be of natural or synthetic origin.

As disclosed herein, a surface modifying molecule (SMM) may be a chemical entity capable of interacting and/or reacting with the surrounding materials. An SMM contains an anchoring group capable of interacting with a matrix and a surface modifying group capable of altering the surface properties of the matrix. The interaction may be covalent or non-covalent (e.g., electrostatic interactions, van der Waals, hydrogen bonding, hydrophobic, aromatic, or combinations thereof). A covalent bond from the covalent interaction is between functional groups. A non-limiting list of functional groups (e.g., anchoring groups) includes amines, amides, imides, hydroxyls, anhydrides, isocyanates, carboxyls (e.g., carboxylic acids), epoxides, sulfhydryls, thiols, acid chlorides (acyl chloride), aldehydes, esters, ketones, alkyl halides, arene, and/or the like. The functional groups can also be the ionized forms of the functional groups, including, but not limited to amines, carboxyls (e.g., carboxylic acids), thiols, and/or the like. For example, a covalent interaction can be between the following pairs: epoxy-amine, epoxy-anhydride, anhydride-hydroxyl, anhydride-amine, amine-isocyanate, hydroxyl-isocyanate, acid chloride-amine, epoxy-phenol, epoxy-carboxyls, arene-anhydride, aldehyde-amine, ketone-amine, ester-amine, alkyl halide-amine, or isocyanate-anhydride. Other pairs with covalent interaction are possible.

In an example, a covalent interaction occurs between at least two functional groups comprising a first functional group and a second functional group. A non-limiting list of the first functional group includes amines, hydroxyls, isocyanates, and epoxides. A non-limiting list of the second functional group includes anhydrides, isocyanates, carboxylic acids, and epoxides. Covalent bonds formed from a reaction between the first functional group and the second group result in the following pairs: epoxide-amine, epoxide-anhydride, anhydride-hydroxyl, amine-isocyanate, hydroxyl-isocyanate, and isocyanate-anhydride.

As disclosed herein, a carrier may be a polymer that is mixed with SMM using melt processing techniques. The carrier is inert to (e.g., does not covalently react or covalently bind to) the SMM and it can carry SMM at very high concentrations (e.g., ≥40% by weight) and may be able to release SMM on application of an external stimuli (e.g., heat). The carrier with SMM can be converted into a staple fiber which can then be carded and blended with the matrix. Polyolefins such as low-density polyethylene (LDPE), linear low-density polyethylene (LLDPE), high-density polyethylene (HDPE), polypropylene (PP), or their derivatives, water soluble polymers such as polyethyleneoxide, styrenic polymers, polyamides such as nylon-12, acetal polymers, anhydride polymers, polycarbonates, polyesters (both water soluble and insoluble types), enteric polymers such as acrylic polymers that are sensitive to pH, thermoset polymers such as phenol-formaldehyde, urea-formaldehyde, epoxy, polyurethane, other species known to those skilled in the art, or combinations thereof may be used as the carrier. Other carriers used can respond to other external stimuli (e.g., ultraviolet irradiation, an electric current, etc.).

In an example, the carrier comprises a polymer comprising nylon 6, nylon 66, polyethylene terephthalate (PET), polyester, polypropylene, polycarbonate, polyacetal, linear low-density polyethylene (LLDPE), low-density polyethylene (LDPE), and high-density polyethylene (HDPE).

In an example, the carrier can non-covalently bind to the SMM. The non-covalent interaction may be electrostatic, aromatic (e.g., a π-π interaction), van der Waals, hydrophobic or through hydrogen bonding.

As disclosed herein, a matrix may be the blend or plurality of staple fibers that has been blended, carded, or otherwise mixed together using processes known in the art. The matrix polymers can be synthetic, natural or a combination of the two. The matrix fibers may be reactive towards or may interact favorably and bind to the SMM.

The present disclosure addresses the issues described above, by providing in-situ surface chemistry using surface segregating or interfacially segregated reactive molecules that are capable of anchoring desired molecules at the interface or surface and, in turn, are anchored to a polymer matrix of an article or finished product (particularly fibers, textiles, and fabrics) and may be stably and uniformly distributed at the surface/interface, though other distributions are possible. This interlocking or anchoring of the surface modification entity only at the surface can help offset the loss in mechanical properties of the finished polymer product wherein the core of the product is unadulterated by any incompatible surface segregating additive. The reactive molecules can include anhydrides of polyolefins such as maleated polypropylene, epoxidized polyolefins, epoxidized silicone molecules, aminated silicones, hydroxylated silicones, acrylated silicones, acrylated waxes, aminated waxes, epoxidized oils such as epoxidized castor oil or epoxidized linseed oils, isocyanate-silicones, thiol modified silicones, aminated waxes, isocyanate-waxes, epoxidized waxes, acrylated waxes, multiepoxy molecules like trimethylolethane triglycidyl ether, multicarboxyl molecules like citric acid or 1,2,3,4-butanetetracarboxylic acid, aldehyde modifiers such as glyoxal, polymer of epichlorohydrin, anhydrides such as maleic anhydride, or other species known to those skilled in the art.

In an example, functionalized epoxide molecules (e.g., anchor molecules) include epoxy modified 9,10-dihydro-9-oxy-10-phosphaphenanthrene-10-oxide (DOPO), SU8, ERISYS GE-31, ERISYS GE-30, ERISYS GE-40, ERISYS GE-38, ERISYS GE-60, trimethylolethane triglycidyl ether and/or combinations thereof.

In an embodiment, SMM is delivered in a blended yarn. Blends of staple fibers may be created by mixing synthetic/natural or synthetic/synthetic blends such that best attributes of different staples can be combined in a single yarn. Often nylon and cotton are blended together to take advantage of feel of cotton and strength of nylon to create a comfortable and durable fabric. This application discloses the idea of a staple fiber that is capable of delivering a reactive or a non-reactive molecule (e.g., an SMM) when it is blended with other staples in a yarn form. The delivery of SMM to the surrounding staples in a yarn setting helps modify the surface of the yarn and the surface of the surrounding staples with a desirable quality. In this case, the SMM can impart hydrophobicity or other properties. In an example, a blend has 50% or less SMM staple. In another example, the blend has 10 to 20% SMM staple, including all 0.1% values and ranges therebetween.

Besides nylon and cotton, other yarns, fabrics, or blends can benefit from the embodiments disclosed herein. Other fabrics can include polyester, rayon, polyaramids such as Kevlar and Nomex, polyimides, polyetherimides, polyamideimides, polyphenylene sulfide, acrylics, polylactic acid based fibers, and blends of such staple fibers.

SMMs can be added to the melt during manufacturing to yield an article that contains SMMs in its interior (e.g., below the surface and/or encapsulated). Such articles are referred to as carriers. A carrier that contains SMMs may be fabricated using injection molding, extrusion, casting, fiber spinning, or other methods known to those skilled in the art. Thus, carriers can be created by melt phase addition of a SMM.

In an example, the SMM can be encapsulated by the carrier and/or disposed on the surface of the carrier. In such an example, the SMM can be attached either covalently or non-covalently.

In an example, at least one SMM can be both encapsulated by the carrier and displayed on the surface of the carrier. In such an example, the SMM penetrates the carrier such that part of the molecule is encapsulated and another part (e.g., a reactive end, for example, but not limited to, an amine, epoxide, and the like) of the molecule is displayed on the exterior.

Description of SMM

In short, the SMM comprises an anchoring group and a surface modifying group (e.g., a surface modifying additive).

In some embodiments, the surface segregating or interfacially segregated reactive molecules (SMM) could be one single molecule that contains two components attached to each other via either covalent bonding, electrostatic, van der Waals interactions, hydrophobic interactions, aromatic interactions, hydrogen bonding, and/or combinations thereof, prior to addition into the polymer matrix. One part of the additive is an anchor molecule (or anchor) that has chemically similar characteristic as the staple fibers in the blend while the other part is the surface modifying additive, such as a fluorinated molecule. The SMM may contain one or many anchoring points and one or many surface modifying moieties. Combination of the anchoring group and surface modifying group may eliminate the need for a separate anchor molecule.

In an example, the anchor and surface modifying additive can also be separate molecules. In other examples, the surface modifying additive may be reacted or bound to an anchor during the process of adding the surface modifying additive to the carrier. In these embodiments, both the anchor and the surface modifying additive may be separately added during processing of the polymer into a carrier staple.

The SMM can be linear, branched, comb shaped, dendritic, or any such combination of molecular architectures. These architectures comprise aliphatic, aryl, and alkyl chains. Examples of such architectures include, but are not limited to, a cyclic monoepoxy cresyl glycidyl ether, a cyclic and branched monoepoxy 2-ethyl hexyl glycidyl ether, linear monoepoxy n-butyl glycidyl ether, branched and linear triepoxy CVC Chemical's ERISYS FE-35 and 35H or GE-35 and 35H, and cyclic and branched monoepoxy p-tert glycidyl ether.

The SMM can be a small molecule or an oligomer, a low molecular weight polymer, or a copolymer which could be alternating or random or a block copolymer.

An example of an SMM that contains two parts that is created in-situ during staple manufacturing is one that contains an epoxy functional molecule (e.g., Trimethylolethane Triglycidyl Ether (ERISYS GE-31, CVC Chemicals)) and an amine functional silicone (e.g., Silamine DG-50 (Siltech Corp.)) which are mixed in a stoichiometry such that all the three epoxy groups on the epoxy molecule (e.g., GE-31) molecule are not reacted with the amine silicone (e.g., Silamine DG-50). When these molecules are melted in the presence of a carrier during processing, they react to form a single molecule that contains reactive epoxy functional groups capable of anchoring it to a matrix staple that contains complimentary functional groups such as the amine end groups on a nylon staple.

In an example, an epoxy functional molecule (e.g., trimethylolethane triglycidyl ether (ERISYS GE-31, CVC Chemicals)), and an amine functional silicone (e.g., Silamine DG-50 (Siltech Corp.)) are reacted in a separate reactor prior to mixing with a carrier polymer to produce staple fiber. An example is shown in the following scheme:

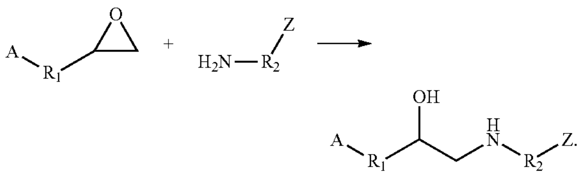

In an example, an isocyanate (e.g., Desmondur N 3200), which is a linear diisocyanate, is reacted with a hydroxyl alkyl glycerol. In another example, an isocyanate (e.g., Desmondur N 3200) is reacted with a branched polyol (e.g., a branched triol).

In an example, an anhydride (e.g., pyromellitic dianhydride) is reacted with an amine (e.g., silamine DG-50).

In an example, an SMM is a single molecule that is already formed prior to addition to the carrier staple. One such example could be a multifunctional epoxy molecule (e.g., SU8 or multifunctional epoxy compounds available from CVC chemicals such as ERISYS GE-31, GE-30, GE-40, GE-38 and GE-60). Such SMMs are mixed with a polyethylene carrier polymer to make staple fibers.

In an example, an SMM could also be a crosslinker (e.g., a covalent crosslinking moiety) that is capable of crosslinking neighboring staple yarn. In one embodiment, a dialdehyde molecule (e.g., glyoxal) can be used as SMM in a polyolefin carrier. This SMM is capable of reacting with hydroxyl groups on neighboring cellulosic fibers (e.g., cotton, rayon, and the like) and crosslinking them. Not intending to be bound by a particular theory, it is important to impart cohesive nature to a bundle of staple fibers, such as when the staple yarn contains multitude of water absorbing fibers (e.g., cotton). When wet, such yarns can reduce strength of the fabric. Crosslinking improves wet strength of such yarns and thereby the fabric.

In an example, a surface modifying species (e.g., silicone-amine), is mixed with an anchor, such as a multifunctional epoxy molecule (e.g., SU8). The amine and epoxy react to form an SMM. The ratio of silicone-amine (monofunctional) to epoxy molecule (e.g., SU8 (a multifunctional with eight available epoxy groups)) could be variable, thereby either modifying one or two, three, or even seven of the eight available epoxy groups on the multifunctional epoxy molecule (e.g., SU8) with the silicone-amine molecule. Thus, the SMM formed can include a silicone surface modifying part and an anchoring part of multifunctional epoxy molecule (e.g., SU8) with unreacted epoxy groups available to anchor this conjugate to the surface of, for example, a nylon staple. An example where there are five epoxy molecules is depicted in the following reaction scheme:

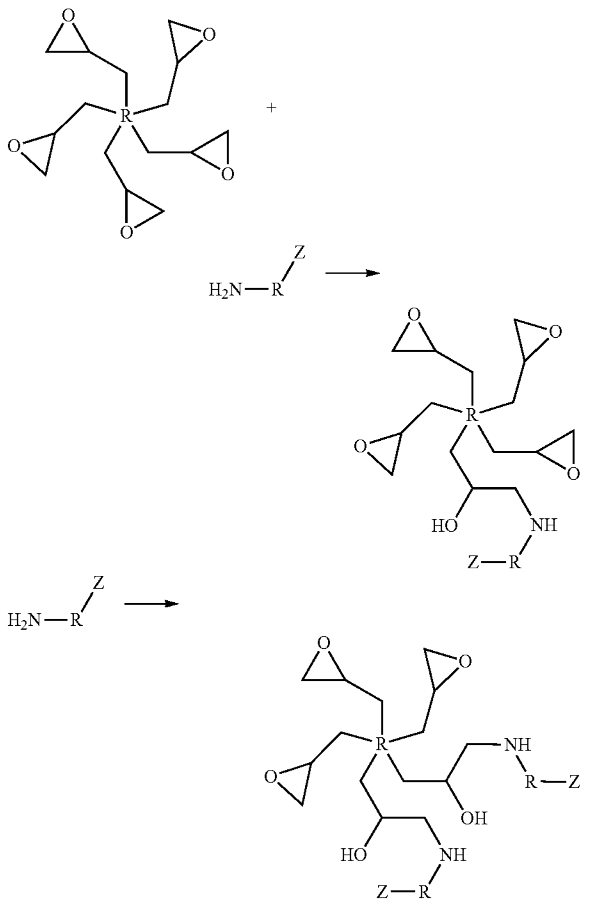

-continued

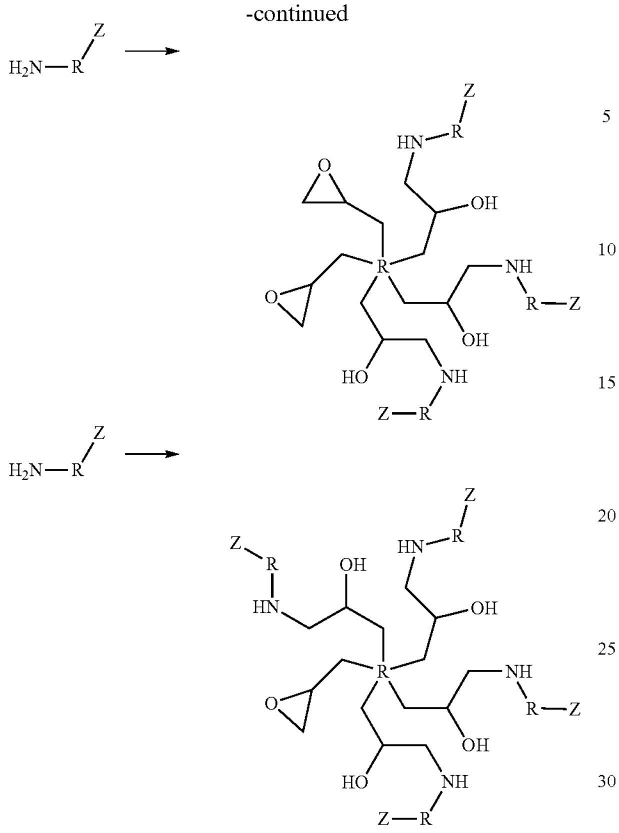

The amount of an SMM in a staple fiber can vary. In an example, the SMM concentration is 5 to 75% by weight, including all 0.1% values and ranges therebetween.

In an example, anchor molecules are polymeric or oligomeric molecules that have reactive functional groups. These may be water insoluble polymers such as polyethylene with functional groups such as, for example, amines, epoxy, anhydride, isocyanate, hydroxyl, carboxyl, or acid chloride. The anchor molecule also could be polyolefins, polyesters, polyamides, styrenics, vinyl polymers, or copolymers of these entities functionalized with any of the above functional groups or other functional groups. The surface modifying additives may be derivatives of water soluble polymers such as polyethylene oxide, which contain functional groups that are reactive with the groups present on the anchor. Such pairings include but are not limited to epoxy-amine, epoxy-anhydride, anhydride-hydroxyl, anhydride-amine, amine-isocyanate, hydroxyl-isocyanate, or acid chloride-amine. The anchor may be made of the same chemical structure as the matrix while the surface modifying entity may be chemically different from the matrix.

Use of SMM and Carrier to Modify Properties of the Yarns Containing Them

Hydrophobic Modification

In an example, additives are added to a melt spinning process, the result of which is a staple fiber that becomes the carrier of an SMM. Such carrier staple fibers are then blended with other staples to create a yarn which can then be subjected an external stimuli to enable the release of the SMM and thereby modify properties of the yarn that is blended with the carrier. Non-limiting examples of additives include chemically inert polypropylene, polyethylene, and polystyrene. These additives can be processed with functional molecules such as, but not limited to amines, epoxides, hydroxyls, and anhydrides.

The following embodiments describe hydrophobic modification of a nylon/cotton staple blended yarn and, after blending, fabric. The nylon/cotton blend is hereafter referred to as NyCo.

NyCo blends are created by mixing staple fibers of nylon and cotton in various ratios. For example, the amount of nylon is 10 to 90%, including all 0.1% values and ranges therebetween, and the amount of cotton is 10 to 90%, including all 0.1% values and ranges therebetween, where the total amount of cotton and nylon is 100%. Preferably, the amount of cotton is 50% and the amount of nylon is 50%. Because both cotton and nylon are not particularly hydrophobic, the resulting blend is very hygroscopic.

In one embodiment, a polyolefin (e.g., such as, but not limited to LLDPE, LDPE, HDPE, or polypropylene) is used as a carrier and is mixed with an epoxidized siloxane molecule (such as those available by Siltech Corp.). The mixture is then melt extruded into staple fibers. Thus, the staple fibers produced contain unreacted silicone-epoxide molecules. When such staples are blended with NyCo in various proportions, a yarn containing SMM can be made. When such yarn is converted into a fabric, the resulting fabric contains unreacted silicone-epoxides contained within the carrier. When such fabric is subjected to a heat treatment such that the fabric is exposed to temperatures above the softening point of the polyolefin carrier, the silicone-epoxides are released into the surrounding blend. The epoxide group can react with the end groups of the nylon staples contained in the yarn thereby modifying the surface of the yarn and thereby the fabric. Temperatures can range from 90° C. to 200° C. for polyolefin extrusions. When the fabric containing these staples is subjected to these temperature ranges, the softening of the staples occurs. Concentration ranges of SMM can be anywhere from 5% to 75% by weight including all 0.1% values and ranges therebetween.

In another embodiment, an SMM has an amine group, an anhydride group, an acid chloride group, a carboxyl group, and/or other such reactive groups capable of reacting with either the end groups of the nylon staple or the hydroxyl functionalities of the cellulose staple contained within the yarn.

In another embodiment, an anchored SMM can be created with reaction between two different groups. For example, the SMM can be created to make a surface more hydrophilic by combining hydrophobic blocks and hydrophilic blocks into a surface modifying additive. Enough driving force can be generated by the hydrophobic blocks to cause surface segregation of the surface modifying additive such that the attached hydrophilic blocks are brought to the interface as well. In one example, hydrophobic blocks (e.g., hydrophobic fluorinated groups such as those present in polytetrafluoroethylene (PTFE)) are attached to hydrophilic blocks (e.g., ethylene oxide blocks, or blocks present in polyethylene glycol or highly water soluble polyethylene oxide). By varying the ratio of the hydrophilic and hydrophobic blocks, one can design a hydrophilic surface modifying additive capable of surface segregation and transforming the surface of a hydrophobic polymer into a wettable surface. This process works with molecules that have fluorine content in the range of approximately 15% to 46%. This process also may work with molecules containing fluorinated species with % F in a range of approximately 5% to 75%. The higher % F containing molecules would be less hydrophilic than the molecules containing lower % F. The fluorine content or %

F is measured in weight/weight (w/w). For example, more than 60% F containing molecules would make the surface segregation higher.

Even if such surface modifying additives can surface segregate to the surface, these surface modifying additives can be washed away if not anchored to the polymer matrix to which they are added. Thus, surface modifying additives are anchored to the polymer matrix to prevent such surface erosion.

In one example, fluorinated polyetherdiols, (e.g., PolyFox from Omnova), are used as surface modifying additives. These polymers are made of hydrophilic backbones consisting of ethylene oxide segments and hydrophobic sidechains. The polymer intermediates have end hydroxyl groups which can be reacted with suitable anchors. In one example, a maleated polypropylene molecule (e.g., GR204 Amplify from Dow) is used as an anchor molecule and can be reacted with the polyether diols (e.g., PolyFox PF-7002) to create an anchored surface modifier for use with a polyolefin matrix. The polypropylene anchor is chemically compatible with the polyolefin backbone while the polyetherdiol (e.g., PolyFox) additive is capable of surface segregation.

In another example, reactive polyethers (e.g., Jeffamine molecules (Huntsman)) are reacted with carboxy (e.g., carboxylic acid) or anhydride functionalized fluorinated compounds (e.g., trifluoroacetic anhydride or dodecafluoroheptanoyl chloride) to yield fluorinated polyether molecules. Such molecules have the ability to surface segregate in a polymeric matrix due to the presence of fluorinated species while providing hydrophilic character due to the polyether blocks.

In yet another example, hydrophilic monomers (e.g., hydroxypropylmethacrylate) are copolymerized with polymerizable monomers (e.g., vinyl monomers) containing fluorinated groups (e.g., 2-(perfluorohexyl)ethyl acrylate) to result in polymers with both hydrophobic and hydrophilic domains.

Controlled-Release Fabrics

In another embodiment, the carrier may be mixed with an active ingredient such as a fragrance, antibacterial substance, antiperspirant substance, UV absorbing substance, insecticidal substance, insect repellent substance, fungicidal substance, medicinal substance, other types of substances, or combination thereof. The carrier may be a polymer that is capable of carrying these active molecules at high concentrations. When such staples are mixed with NyCo staples or other staples, the resulting yarn and fabric would then contain these active molecules.

The active ingredients may be medicinal in nature. For example, a staple yarn containing carrier staple fibers can be loaded with coagulants, anti-coagulants, blood thinners, thrombogenic moieties/groups, analgesics, anti-inflammation agents, etc. When such yarn is woven into a bandage, the bandage then would contain one or many of these medicinal ingredients capable of helping heal, clot, and/or reduce pain as necessary.

The yarns may also contain carrier staple fibers that are made with waxes that are capable of melting at body temperatures but are solid below body temperatures. Such waxes would them melt when such fabric made of wax containing yarn is applied to a part of the body. The melted wax would then migrate out of the bandage and form a non-sticking layer such that the bandage could be easily removed without reinjuring the wound to which it was applied.

The yarns may also contain an insect-repellant (e.g., DEET (N,N-Diethyl-meta-toluamide) or another insect-repellant). The carrier staple that contains the insect repellent (e.g., DEET) could be added to the mix of nylon cotton staple blend to create a yarn that contains insect repellent (e.g., DEET) of appropriate amounts (e.g., an amount appropriate enough to repel insects from person wearing clothes made of such yarn). Insect repellent (e.g., DEET) release could be triggered by either passive release (e.g., diffusion of DEET down a concentration gradient, such as from inside the carrier yarn to the outside) or thermally where in the carrier staple containing insect repellent (e.g., DEET) is compromised by a heat treatment method. The carrier staple containing insect repellent (e.g., DEET) could also be a water soluble or a water responsive polymer (e.g., polyethylene oxide or polyethylene glycol (PEO or PEG) or various copolymers containing polyethyleneoxide (such as PEG-PLA, PEG-PLGA, PEG-silicone, PEG-polyethylene, PEG-polycaprolactone, PEG-polystyrene, etc.)). When the perspiration from a wearer's body is absorbed in the article of clothing, it can trigger the release of the insect repellent (e.g., DEET) from the water responsive carrier staple. Thus, an insect-repellent may be released.

The insecticide or insect-repellant could also be permethrin or similar pyrethroid molecule that are known neurotoxins for insects.

For any of the embodiments disclosed herein, materials can be configured to be resistant to washing or perspiration. Materials also can be configured to release during washing or perspiration.

In one embodiment, the carrier could be made of low melting polymers such as polyolefins such that when the resulting fabric is thermally treated, the carrier melts and locally releases the fragrance or insecticide. The active ingredient is slowly released into the surrounding atmosphere. In case of actives whose presence is needed in the staple fibers over a long time, the carrier staples can be made of high melting polymers such that the active ingredient is encapsulated in the carrier.

Phase Change Materials (PCMs)

PCMs store, release, or absorb heat as they change from solid to liquid form reversibly, giving off heat as they change to a solid state and absorbing heat as they return to a liquid state. PCMs can be loaded by melt compounding with a carrier. The carrier may be selected such that it retains the PCM inside and/or on the surface of the staple fiber. The carrier staple can be blended with other staple fibers to make a yarn which is then converted into a fabric. The fabric then undergoes cold-hot transition by freezing and melting of the PCM in or on the fiber. The PCM can be considered an SMM or can be used, combined, or interact with an SMM.

PCMs can be organic, inorganic, or a combination of both. Organic PCMs can be polymeric or oligomeric. Examples of PCMs include eicosane, paraffins (such as those which range from C8 to C40), polyethylene glycols, fatty acids, polyalcohols, or polyethylenes.

PCMs in a textile or fabric can provide comfort to a wearer as the wearer goes between hot and/or cold environments. Some PCMs change phases within a temperature range that is just above and just below body temperature (e.g., approximately 98.6° F.).

The yarns may also contain carrier staple fibers that are made by mixing polymers such as nylon, polyester, polyolefin, or other materials with materials that have a phase change at a desired temperature.

Embodiments can include fibers, such as hollow fibers, loaded with PCMs or can include bicomponent fibers where one of the components is loaded with PCM. These can be continuous filaments or staple fibers.

In an example, a PCM is mixed in melt stage with a carrier polymer in ratios ranging from 5% to 50% (including all 0.1 values and ranges therebetween) and extruded into staple fibers or continuous yarns. The PCM can be encapsulated within the polymer matrix of the staple fiber and can undergo heat transition when exposed to appropriate temperature.

The PCM can, for example, stay encapsulated within a carrier fiber, but also can be released within the interstices of the yarn fiber. In either instance, the PCM can absorb and release heat.

Fabrics with PCMs can be combined with other materials or SMMs, such as insecticides.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

The invention claimed is:

1. A staple fiber comprising:

a polymer matrix;

a surface modifying molecule releasably connected to the polymer matrix and the surface modifying molecule includes a hydroxypropylmethacrylate copolymerized with a vinyl monomer containing fluorinated groups, wherein the surface modifying molecule includes a functional group that interacts with the polymer matrix and a surface modifying group; and an anchor molecule attached to the surface modifying molecule by covalent bonding, an electrostatic interaction, a hydrophobic interaction, an aromatic interaction, hydrogen bonding, and/or a van der Waals interaction, wherein the anchor molecule has reactive functional groups and is a polymeric or oligomeric molecule.

2. The staple fiber of claim 1, wherein the functional group is configured to bond or react with the polymer matrix.

3. The staple fiber of claim 1, wherein the anchor molecule has a chemically similar characteristic as the polymer matrix.

4. The staple fiber of claim 1, wherein the reactive functional groups include at least one of amines, amides, imides, hydroxyls, anhydrides, isocyanates, carboxyls, epoxy, sulfhydryls, thiols, acid chlorides (acyl chloride), aldehydes, esters, ketones, alkyl halides, or arenes.

5. The staple fiber of claim 4, wherein the polymeric or oligomeric molecule includes at least one of a water insoluble polymer, polyethythene, polyolefin, polyester, polyamide, styrenic, vinyl polymer, or copolymers thereof.

6. The staple fiber of claim 1, wherein the surface modifying group includes fluorine and/or a fluorinated polyether molecule.

7. The staple fiber of claim 1, wherein the surface modifying group includes a derivative of a water soluble polymer including functional groups that are reactive with groups present on the functional group that interacts with the polymer matrix.

8. The staple fiber of claim 7, wherein the water soluble polymer includes polyethyleneoxide.

9. The staple fiber of claim 7, wherein the functional groups react and form a covalent interaction that includes one of epoxy-amine, epoxy-anhydride, anhydride-hydroxyl, anhydride-amine, amine-isocyanate, hydroxyl-isocyanate, acid chloride-amine, epoxy-phenol, epoxy-carboxyls, arene-anhydride, aldehyde-amine, ketone-amine, ester-amine, alkyl halide-amine, or isocyanate-anhydride.

10. The staple fiber of claim 1, wherein the surface modifying molecule includes an amine group, an anhydride group, an acid chloride group, a carboxyl group, or a reactive group configured to react with a nylon end group or the hydroxyl functionalities of cellulose.

11. The staple fiber of claim 1, wherein the surface modifying molecule includes hydrophobic and hydrophilic blocks, wherein the hydrophobic blocks include polytetrafluoroethylene (PTFE) and the hydrophilic blocks include ethylene oxide blocks.

12. The staple fiber of claim 1, wherein the vinyl monomer containing fluorinated groups includes 2-(perfluorohexyl)ethyl acrylate.

13. A fabric comprising woven yarns including the staple fiber of claim 1.

14. The fabric of claim 13, wherein the surface modifying molecule renders the fabric one or more of hydrophobic, hydrophilic, insecticidal, repellant to insects, fragrant, antibacterial, antiperspirant, UV absorbing, fungicidal, and/or medicinal.

15. The fabric of claim 13, wherein the surface modifying molecule is a phase change material.

* * * * *